(12) United States Patent
Nakayama et al.

(10) Patent No.: US 11,358,276 B2
(45) Date of Patent: Jun. 14, 2022

(54) ROBOT AND ROBOT SYSTEM (71) Applicant: FANUC CORPORATION, Yamanashi (JP)

(72) Inventors: Kazutaka Nakayama, Yamanashi (JP); Kenichiro Oguri, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 294 days.

(21) Appl. No.: 16/540,565

(22) Filed: Aug. 14, 2019

(65) Prior Publication Data

US 2020/0070341 A1 Mar. 5, 2020

(30) Foreign Application Priority Data

Aug. 31, 2018 (JP) .............................. JP2018-163209

(51) Int. Cl.
*B25J 9/16* (2006.01)
*B25J 13/08* (2006.01)

(52) U.S. Cl.
CPC ........... *B25J 9/1612* (2013.01); *B25J 9/1633* (2013.01); *B25J 9/1641* (2013.01); *B25J 13/085* (2013.01); *G05B 2219/37319* (2013.01); *G05B 2219/40599* (2013.01)

(58) Field of Classification Search
CPC ...... B25J 9/1612; B25J 9/1641; B25J 9/1633; B25J 13/085; B25J 17/0283; B25J 9/1664; G05B 2219/39529; G05B 2219/37319; G05B 2219/40599; G01L 3/00; G01R 31/34; A61B 34/30; A61B 34/70
See application file for complete search history.

(56) References Cited

U.S. PATENT DOCUMENTS

| 2011/0068595 | A1* | 3/2011 | Ihrke | B25J 15/0009 |
| | | | | 294/106 |
| 2012/0253512 | A1 | 10/2012 | Sato et al. | |
| 2013/0310973 | A1* | 11/2013 | Tanaka | B25J 9/06 |
| | | | | 700/245 |
| 2015/0025682 | A1 | 1/2015 | Sato et al. | |
| 2015/0209961 | A1 | 7/2015 | Komatsu et al. | |
| 2015/0290809 | A1* | 10/2015 | Nakagawa | B25J 9/1676 |
| | | | | 700/258 |
| 2016/0221193 | A1 | 8/2016 | Sato | |
| 2017/0080574 | A1* | 3/2017 | Kuroda | A61B 34/74 |

(Continued)

FOREIGN PATENT DOCUMENTS

| EP | 2660013 A1 | 11/2013 |
| JP | H0230487 A | 1/1990 |

(Continued)

OTHER PUBLICATIONS

Japanese Office Action dated Sep. 1, 2020, for Japanese Patent Application No. 2018-163209.

(Continued)

*Primary Examiner* — Khoi H Tran
*Assistant Examiner* — Tanner L Cullen
(74) *Attorney, Agent, or Firm* — Karceski IP Law, PLLC (57) ABSTRACT

A robot includes: a wrist unit including a plurality of wrist joints; and a plurality of basic joints configured to determine the position of the wrist unit in a three-dimensional space. Only the basic joints are provided with torque sensors configured to detect torque of the basic joints about axis lines.

11 Claims, 5 Drawing Sheets

(56) References Cited

U.S. PATENT DOCUMENTS

| | | | |
|---|---|---|---|
| 2017/0259436 A1 | 9/2017 | Nakayama et al. | |
| 2018/0079629 A1* | 3/2018 | Abdallah | B25J 13/089 |
| 2018/0200881 A1 | 7/2018 | Ishii | |
| 2018/0215054 A1* | 8/2018 | Brudniok | B25J 19/02 |
| 2018/0243928 A1 | 8/2018 | Haddadin | |
| 2018/0370049 A1 | 12/2018 | Yoon et al. | |
| 2019/0001501 A1* | 1/2019 | Roberts | B25J 13/085 |
| 2019/0054620 A1* | 2/2019 | Griffiths | B25J 9/1666 |
| 2019/0091861 A1 | 3/2019 | Kasai et al. | |
| 2019/0107454 A1* | 4/2019 | Lin | B25J 9/163 |
| 2019/0365489 A1* | 12/2019 | Kasai | G01L 5/00 |
| 2020/0122337 A1* | 4/2020 | Matthias | B25J 9/1633 |

FOREIGN PATENT DOCUMENTS

| | | | | |
|---|---|---|---|---|
| JP | H0933369 A | | 2/1997 | |
| JP | H1142574 A | * | 2/1999 | B25J 9/10 |
| JP | H1177571 A | | 3/1999 | |
| JP | 2010137288 A | * | 6/2010 | B25J 19/06 |
| JP | 2010137288 A | | 6/2010 | |
| JP | 2012139762 A | | 7/2012 | |
| JP | 2012206219 A | | 10/2012 | |
| JP | 2015157352 A | | 9/2015 | |
| JP | 2015199174 A | | 11/2015 | |
| JP | 2016144861 A | | 8/2016 | |
| JP | 2017159397 A | | 9/2017 | |
| JP | 2017177255 A | | 10/2017 | |
| JP | 2018111174 A | | 7/2018 | |
| JP | 2018528085 A | | 9/2018 | |
| WO | WO-2016110320 A1 | * | 7/2016 | B25J 9/1633 |
| WO | 2017130926 A1 | | 8/2017 | |

OTHER PUBLICATIONS

Japanese Search Report by Registered Search Organization dated Sep. 1, 2020, for Japanese Patent Application No. 2018-163209.

* cited by examiner

ROBOT AND ROBOT SYSTEM

CROSS-REFERENCE TO RELATED APPLICATIONS

This application is based on and claims priority to Japanese Patent Application No. 2018-163209, filed on Aug. 31, 2018, the entire content of which is incorporated herein by reference.

FIELD OF THE INVENTION

The present invention relates to a robot and a robot system.

BACKGROUND OF THE INVENTION

A conventionally known robot includes a high drive power servomotor for driving each of a first shaft to a third shaft, and a low drive power servomotor for driving each of a fourth shaft to a sixth shaft (refer to Japanese Unexamined Patent Application, Publication No. Hei 11-77571, for example). A known human collaborative robot system performs direct teaching in which movement of an arm is allowed as an operator directly touches and moves the arm (refer to Japanese Unexamined Patent Application, Publication No. 2018-111174, for example).

SUMMARY OF THE INVENTION

An aspect of the present invention provides a robot including: a wrist unit including a plurality of wrist joints; and a plurality of basic joints configured to determine the position of the wrist unit in a three-dimensional space. Only the basic joints are provided with torque sensors configured to detect torque of the basic joints about axis lines.

Another aspect of the present invention provides a robot system including the above-described robot and a controller configured to control the robot. Outline shape information of the robot is stored in the controller. The controller restricts a motion range of at least one of the basic joints and the wrist joints to prevent the outline of the robot from overlapping the axis line of at least one of the basic joints.

Another aspect of the present invention provides a robot system including the above-described robot and a controller configured to control the robot. A mechanism restricts a motion range of at least one of the basic joints and the wrist joints to prevent the outline of the robot from overlapping the axis line of at least one of the basic joints.

DESCRIPTION OF EMBODIMENT(S) OF THE INVENTION

The following describes a robot 100 according to an embodiment of the present invention with reference to the accompanying drawings.

The robot 100 according to the present embodiment is a vertical articulated type robot including six joints rotated about respective axis lines.

Figure 1:
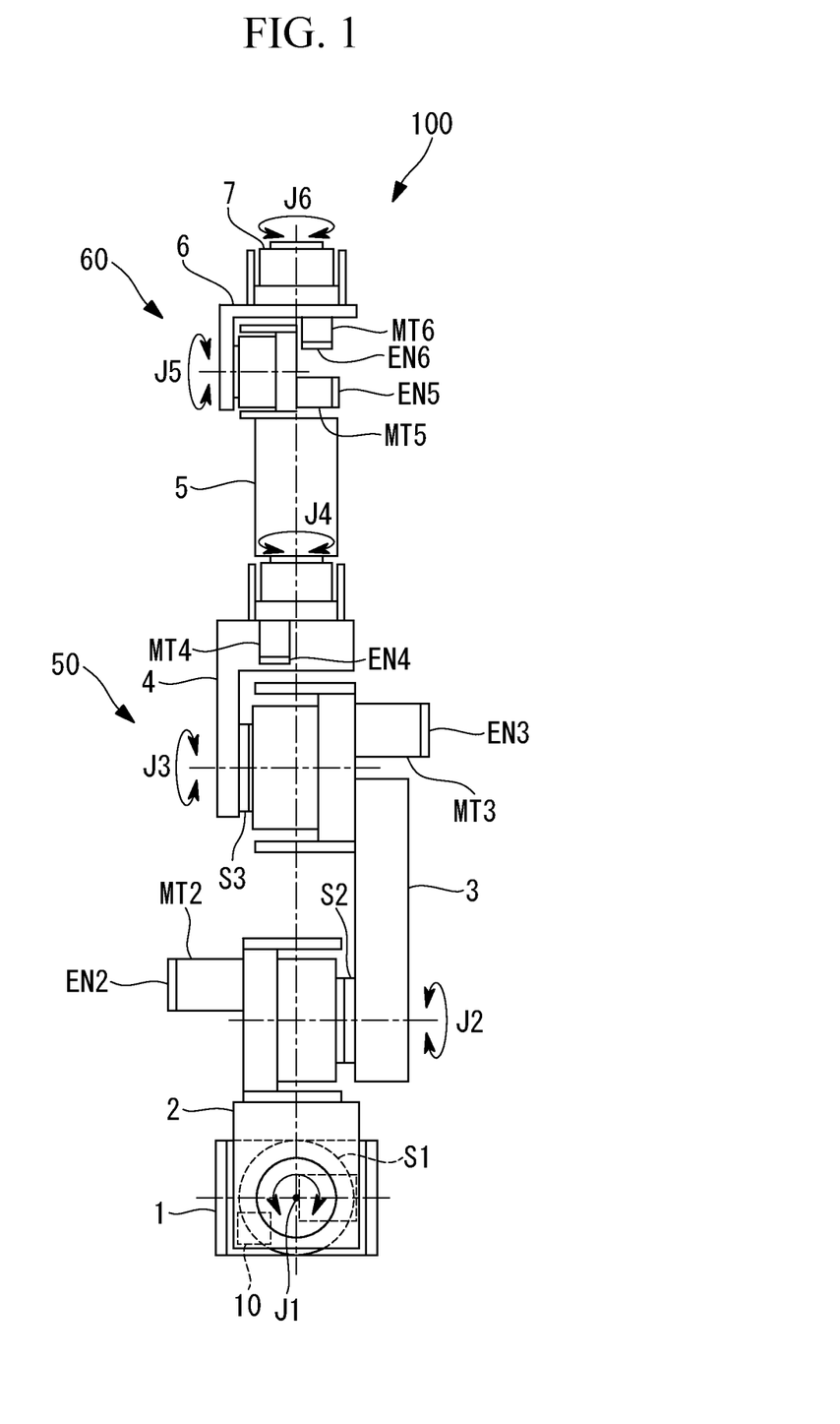
FIG. 1 is a schematic plan view a robot according to an embodiment of the present invention.

As illustrated in FIG. 1, the robot 100 includes a base (basic joint) 1 fixed to an installation surface, a rotational barrel (basic joint) 2 supported to the base 1 rotatably about a shaft (axis line) J1 extending in the vertical direction, a first arm (basic joint) 3 supported to the rotational barrel 2 rotatably about a horizontal shaft (axis line) J2 orthogonal to the shaft J1, a second arm (basic joint) 4 supported to the first arm 3 rotatably about a shaft (axis line) J3 parallel to the shaft J2, a first wrist element (wrist joint) 5 supported to the second arm 4 rotatably about a shaft (axis line) J4 twisted relative to the shaft J3, a second wrist element (wrist joint) 6 supported to the first wrist element 5 rotatably about a shaft (axis line) J5 orthogonal to the shaft J4, and a third wrist element (wrist joint) 7 supported to the second wrist element 6 rotatably about a shaft (axis line) J6 orthogonal to the shaft J5. Hereinafter, the base 1 to the second arm 4 are also referred to as a basic shaft 50, and the first wrist element 5 to the third wrist element 7 are also referred to as a wrist unit 60.

The robot 100 also includes a first torque sensor (torque sensor) S1 disposed between the base 1 and the rotational barrel 2 and configured to detect torque about the shaft J1, a second torque sensor (torque sensor) S2 disposed between the rotational barrel 2 and the first arm 3 and configured to detect torque about the shaft J2, and a third torque sensor (torque sensor) S3 disposed between the first arm 3 and the second arm 4 and configured to detect torque about the shaft J3. The torque sensors S1, S2, and S3 are identical to each other. The robot 100 includes no torque sensor configured to detect torque of the wrist unit 60 about the shafts J4, J5, and J6.

Figure 2:
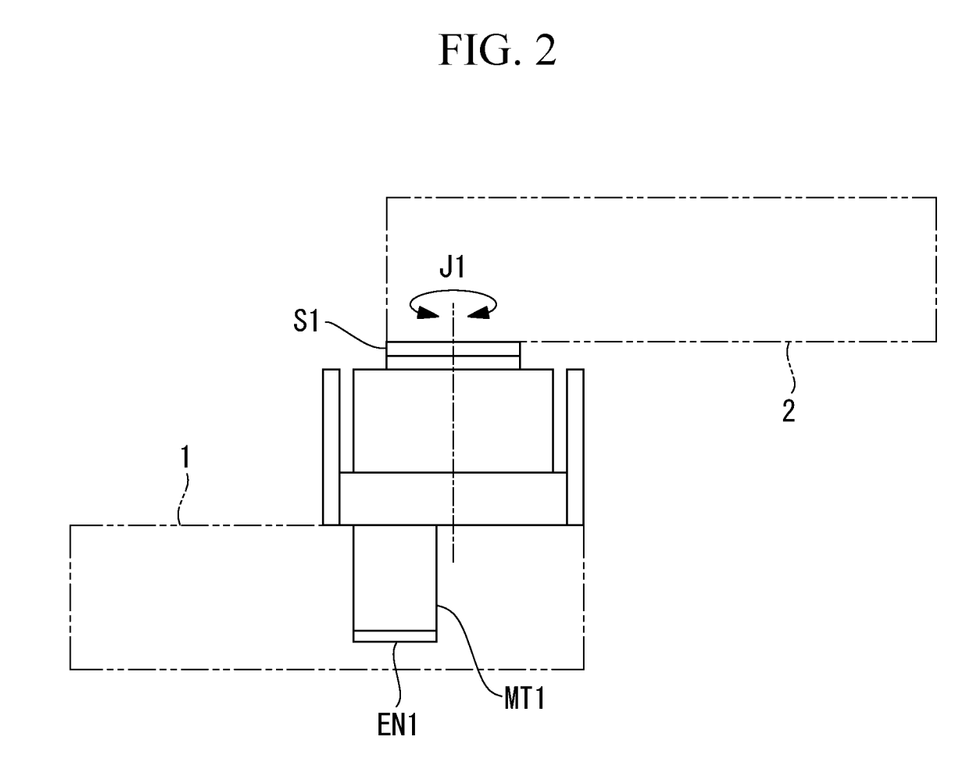
FIG. 2 is a schematic side view of a part at which a base and a rotational barrel are connected with each other in the robot in FIG. 1.

The robot 100 also includes motors MT1 to MT6 configured to drive the respective components about the shafts J1 to J6, and a controller 10 configured to control the motors MT1 to MT6. In FIG. 1, reference signs EN1 to EN6 denote encoders configured to detect the rotation angles of the motors MT1 to MT6 about the shafts J1 to J6. The motor MT1, which drives the rotational barrel 2 about the shaft J1 relative to the base 1, and the encoder EN1 are illustrated in FIG. 2 but not in FIG. 1.

The controller 10 includes a CPU, a ROM, and a RAM (not illustrated). The controller 10 executes the function of a computer program stored in the ROM as the CPU loads the computer program onto the RAM.

Figure 3:
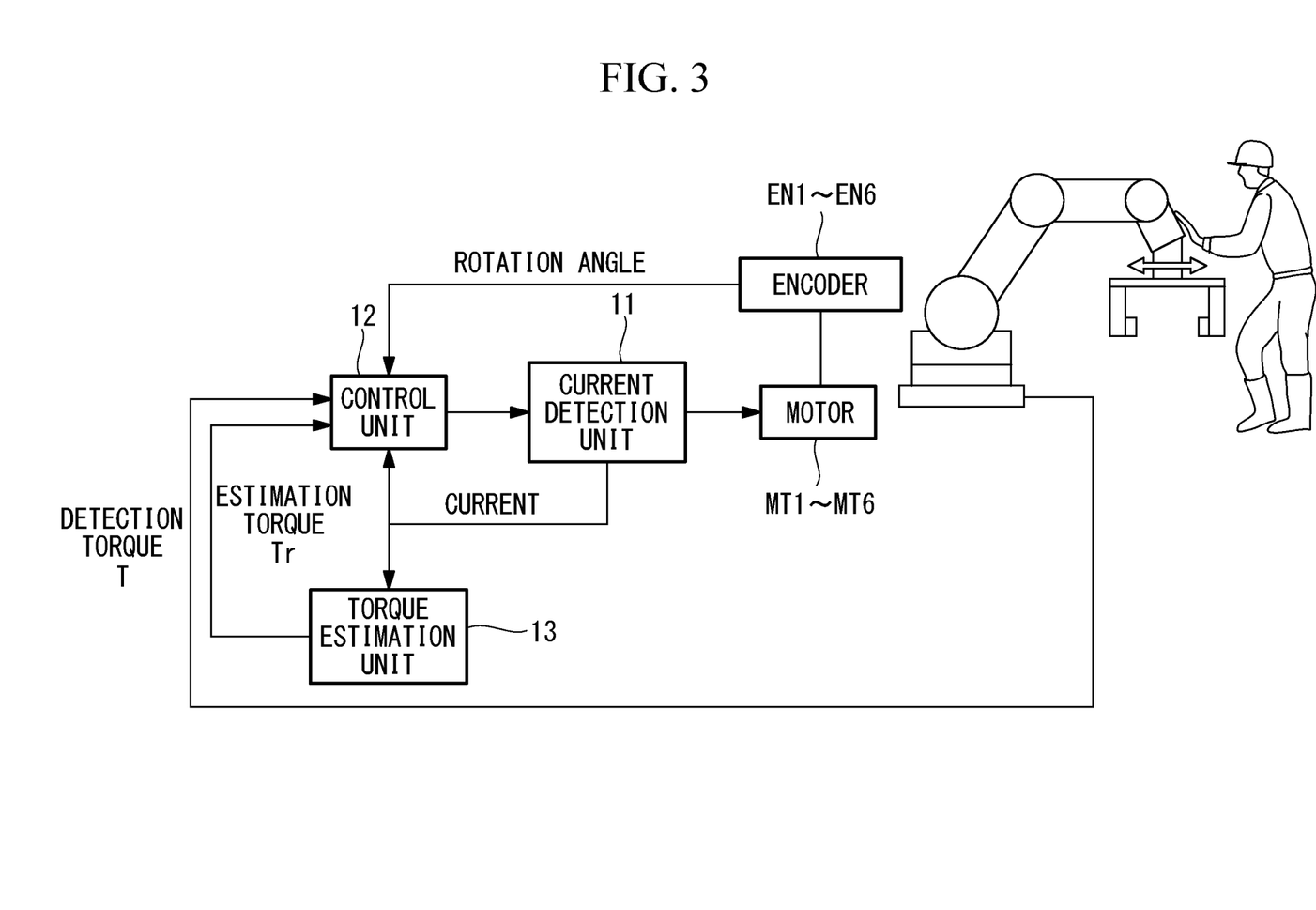
FIG. 3 is a block diagram of torque control of a motor by a controller of the robot in FIG. 1.

As illustrated in FIG. 3, the controller 10 drives the motors MT1 to MT6 by outputting drive current to the motors MT1 to MT6 included in the robot 100. In FIG. 3, for simplification of illustration, the motors MT1 to MT6 are collectively disposed at a position separated from the robot 100.

The controller 10 includes a current detection unit 11 configured to detect the drive current to the motors MT1 to MT6, a torque estimation unit 13 configured to estimate estimation torque Tr about the shafts J4 to J6 based on the detected drive current, and a control unit 12 configured to perform position feedback based on the rotation angles detected by the encoders EN1 to EN6 and current feedback based on the drive current detected by the current detection unit 11 and control the motors MT1 to MT6 based on the estimation torque Tr estimated by the torque estimation unit 13 and detection torque T detected by each torque sensor.

The torque estimation unit 13 estimates the torque Tr about the shafts J4 to J6 based on the drive current to the motors MT4 to MT6 of the wrist unit 60, which is detected by the current detection unit 11.

In a teaching mode, when the detection torque T is detected by the torque sensors S1 to S3, the control unit 12 inputs, to the motors MT1 to MT3, torque for rotating the basic shaft 50 about the shafts J1 to J3 in a direction same as the direction of torque acting about the shafts J1 to J3. In other words, the control unit 12 controls the motors MT1 to MT3 to generate torque that assists rotation caused about the shafts J1 to J3 by external force. The assisting torque may be changed in accordance with the magnitude of the detection torque T obtained by the torque sensors S1 to S3, or may be constant.

When external force acts on the wrist unit 60 or a tool mounted on the wrist unit 60, the control unit 12 detects contact on the tool by an operator based on the estimation torque Tr estimated by the torque estimation unit 13 upon change in the drive current to the motors MT4 to MT6, and controls the motors MT1 to MT6 to stop or retract the robot 100.

The following describes effects of the robot 100 according to the present embodiment thus configured.

The position of the wrist unit 60 in the three-dimensional space is determined by rotating the three basic joints of the basic shaft 50, and the posture of a tool attached to a tip of the wrist unit 60 is determined by rotating the three wrist joints of the wrist unit 60.

For example, when the operator contacts an optional position of the robot 100, any of the torque sensors S1 to S3 determines that external force is applied to the robot 100 as torque about the shafts J1 to J3. When the operator contacts the wrist unit 60 or the tool, the estimation torque Tr is estimated by the torque estimation unit 13 and the contact of the operator is detected.

Accordingly, when no torque about the shafts J4 to J6 is detected, the contact between the operator and the robot 100 can be highly sensitively detected. In addition, no torque sensors need to be provided for the shafts J4 to J6, and thus the cost of the robot 100 can be reduced.

Since the torque estimation unit 13 estimates torque about the shafts J4 to J6 based on the current to the motors MT4 to MT6 detected by the current detection unit 11, no torque sensors need to be disposed on the shafts J4 to J6. Accordingly, the cost of the robot 100 can be reduced by installing no torque sensors, which are expensive, on the shafts J4 to J6, and safety of the operator can be ensured by detecting contact of the operator with tools attached to the shafts J4 to J6.

In the teaching mode, when external force is applied to the wrist unit 60 or the tool, the control unit 12 drives the shafts J1 to J3 in a direction identical to the direction of the external force. Accordingly, the position of the wrist unit 60 in the three-dimensional space can be easily changed by applying external force to the robot 100. Simultaneously, the control unit 12 does not control the wrist unit 60 in accordance with the external force, and thus the posture of the tool can be maintained upon reception of the external force.

Figure 4:
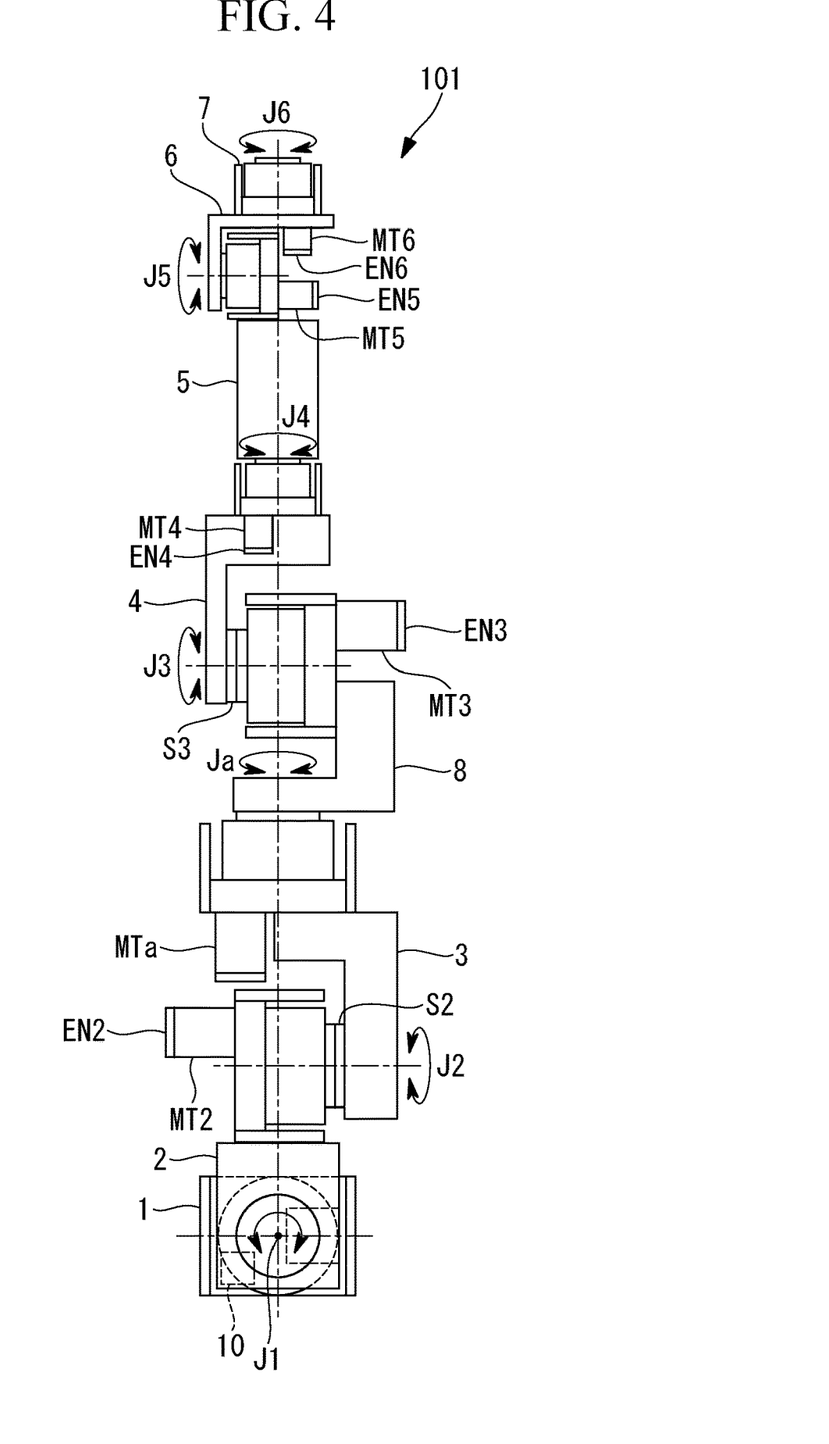
FIG. 4 is a schematic plan view of the robot in FIG. 1 according to a modification.

The robot 100 according to the above-described embodiment includes the basic shaft 50 including the three basic joints about the shafts J1 to J3, and the wrist unit 60 including the three wrist joints about the shafts J4 to J6. Instead, a robot 101 including a redundant joint about a shaft Ja (redundant axis) in addition to the six joints about the shafts J1 to J6 as illustrated in FIG. 4 may be employed. The robot 101 includes a redundant arm 8 configured to rotate relative to the first arm 3 about the shaft Ja orthogonal to the shaft J2, and a motor MTa configured to drive the redundant arm 8. The robot 101 includes a torque sensor configured to detect torque about the shaft Ja.

According to this seven-shaft articulated type robot 101, the basic shaft 50 can be changed into a plurality of states while the redundant joint fixes the wrist unit 60 to a position in the three-dimensional space. The redundant joint may include no torque sensor.

The wrist unit 60 according to the above-described embodiment may have a prevention structure for not pinching the operator. In the prevention structure, for example, a seam of a part at which the second wrist element 6 and the third wrist element 7 are connected with each other is reduced, and the size of the gap between the second wrist element and the third wrist element when the elements come closest to each other is sufficiently large. This configuration can prevent, for example, an arm of the operator from being pinched in the seam or the gap, thereby improving safety of the operator.

A robot system 300 including the robot 100 described above and a controller 200 described below may be employed.

Specifically, the controller 200 may store the outline shape of the robot 100 and restrict operation of at least one of the shafts J1 to J6 to prevent the outline shape of the robot 100 from overlapping the axis line of at least one of the shafts J1, J2, and J3. Accordingly, external force acting on any of all outer surfaces of the robot 100 can be reliably detected by the torque sensors S1 to S3 provided to the shafts J1 to J3.

Figure 5:
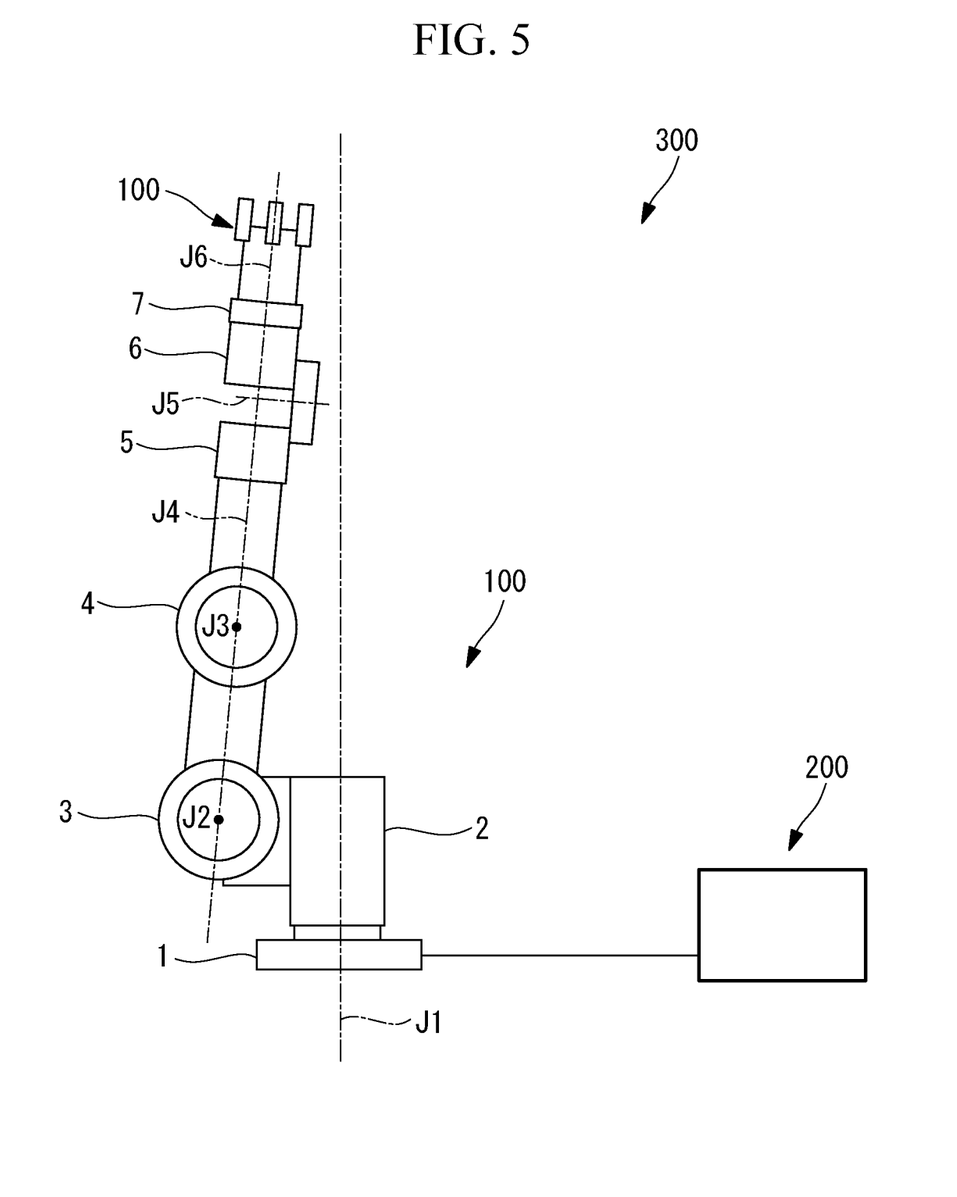
FIG. 5 is a schematic overall view of a robot system including the robot in FIG. 1.

For example, external force acting on any of all outer surfaces of the robot 100 can be detected by the first torque sensor S1 provided to the shaft J1 by performing the operation restriction to prevent the outline shapes of the shafts J2 to J6 from overlapping the axis line of the shaft J1 as illustrated in FIG. 5.

When a tool 110 is attached to the tip of the wrist unit 60, the controller 200 may also store the outline shape of the tool 110 and restrict operation of at least one of the shafts J1 to J6 to prevent the outline shape of the tool 110 from overlapping the axis line of at least one of the shafts J1, J2, and J3. Accordingly, external force acting on any of all outer surfaces of the tool 110 can be reliably detected by any of the torque sensors S1 to S3 provided to the shafts J1 to J3. The above-described operation restriction may be performed on software or by a mechanism.

As a result, the following aspect is derived from the above described embodiment.

An aspect of the present invention provides a robot including: a wrist unit including a plurality of wrist joints; and a plurality of basic joints configured to determine the position of the wrist unit in a three-dimensional space. Only the basic joints are provided with torque sensors configured to detect torque of the basic joints about axis lines.

According to the present aspect, the position of the wrist unit in the three-dimensional space is determined by operating the plurality of basic joints, and the posture of a tool attached to a tip of the wrist unit is determined by operating the plurality of wrist joints included in the wrist unit. When an operator contacts an optional position of the robot, torque of each basic joint about the axis line is detected by any of the torque sensors provided to the plurality of basic joints, respectively. Accordingly, when no torque of the wrist joints about the axis lines is detected, the contact between the operator and the robot can be highly sensitively detected. In addition, cost reduction can be achieved by providing no torque sensors to the wrist joints.

The above-described aspect may further include: a motor configured to drive each wrist joint; a current detection unit configured to detect current supplied to each motor; and a torque estimation unit configured to estimate torque of each the wrist joint about the axis line based on the detected current.

With this configuration, when no torque sensor is disposed on each wrist joint, torque of the wrist joint about the axis line is estimated by the torque estimation unit based on the current to the motor configured to drive the wrist joint. Accordingly, cost reduction can be achieved by installing no torque sensors, which are expensive, on the wrist joints, and safety of the operator can be ensured by detecting contact of the operator with a tool attached to the wrist unit.

The above-described aspect may further include a control unit configured to operate, when torque generated about the axis line of each basic joint by external force is detected by each the torque sensor, each the basic joint in a direction identical to the direction of the detected torque.

With this configuration, when external force is applied to the wrist unit or the tool, each basic joint is driven by the control unit in a direction identical to the direction of the external force, and thus the wrist can be easily moved in a desired direction in the three-dimensional space. Simultaneously, the wrist unit is not controlled to operate in the direction of the external force, and thus the posture of the tool can be maintained upon reception of the external force.

The above-described aspect may include the three basic joints, and each basic joint may be provided with the torque sensor.

With this configuration, the three-dimensional position of the wrist unit can be optionally determined through actuation of the three basic joints. In addition, three-dimensional torque can be detected by the torque sensor provided to each basic joint.

The above-described aspect may include the four basic joints, and each basic joint may be provided with the torque sensor.

With this configuration, one of the four basic joints can function as a redundant axis, and a basic shaft including the plurality of basic joints can be changed into a plurality of states while the wrist unit is fixed to an optional position in the three-dimensional space. When the operator contacts an optional position of the robot, torque of each basic joint about the axis line is detected by any of the torque sensors provided to the four basic joints, respectively. Accordingly, when no torque of the wrist joints about the axis lines is detected, the contact between the operator and the robot can be highly sensitively detected. In addition, cost reduction can be achieved by providing no torque sensors to the wrist joints.

The above-described aspect may include the four basic joints, and three of the basic joints except for one of the basic joints as a redundant axis may be each provided with the torque sensor.

With this configuration, one of the four basic joints can function as a redundant axis, and a basic shaft including the plurality of basic joints can be changed into a plurality of states while the wrist unit is fixed to an optional position in the three-dimensional space. When the operator contacts an optional position of the robot, torque of each basic joint about the axis line is detected by any of the torque sensors provided to the three basic joints, respectively, except for the redundant axis. Accordingly, when no torque of the wrist joints about the axis lines is detected, the contact between the operator and the robot can be highly sensitively detected.

In addition, cost reduction can be achieved by providing no torque sensors to the wrist joints and one basic joint as the redundant axis.

In the above-described aspect, the torque sensors provided to the basic joints may be identical to each other.

With this configuration, cost reduction can be achieved through reduction of the number of kinds of components.

In the above-described aspect, the wrist unit may have a pinching prevention structure.

This configuration can prevent the operator from being pinched by the wrist unit on which no torque sensor is disposed, thereby improving safety of the operator.

Another aspect of the present invention provides a robot system including the above-described robot and a controller configured to control the robot. Outline shape information of the robot is stored in the controller. The controller restricts a motion range of at least one of the basic joints and the wrist joints to prevent the outline of the robot from overlapping the axis line of at least one of the basic joints.

Another aspect of the present invention provides a robot system including the above-described robot and a controller configured to control the robot. A mechanism restricts a motion range of at least one of the basic joints and the wrist joints to prevent the outline of the robot from overlapping the axis line of at least one of the basic joints.

In the above-described aspect, a tool may be attached to a tip of each wrist joint, the control unit may store outline shape information of the tool, and the control unit may restrict a motion range of at least one of the basic joints and the wrist joints to prevent the outline of the tool from overlapping the axis line of at least one of the basic joints.

The present invention provides an effect of achieving cost reduction while ensuring safety of an operator.

The invention claimed is:
1. A robot comprising:
a wrist including a plurality of wrist joints;
a motor configured to drive each wrist joint;
a plurality of basic joints configured to determine the position of the wrist in a three-dimensional space; and
a first controlled configured to
detect current supplied to each motor, and
estimate torque of each wrist joint about the axis line based on the detected current,
wherein only the basic joints are provided with torque sensors configured to detect torque of the basic joints about axis lines.

2. The robot according to claim 1, wherein, when the torque generated about the axis line of each basic joint by external force is detected by each torque sensor, the first controller is configured to operate each basic joint in a direction identical to the direction of the detected torque.

3. The robot according to claim 1, comprising three basic joints, wherein each basic joint is provided with a torque sensor.

4. The robot according to claim 1, comprising four basic joints, wherein each basic joint is provided with a torque sensor.

5. The robot according to claim 1, comprising four basic joints, wherein three of the basic joints, except for one of the basic joints as a redundant axis, are each provided with a torque sensor.

6. The robot according to claim 1, wherein the torque sensors provided to the basic joints are identical to each other.

7. The robot according to claim 1, wherein the wrist has a pinching prevention structure.

8. A robot system comprising:
the robot according to claim 1; and
a second controller configured to control the robot,
wherein a limiter restricts a motion range of at least one of the basic joints and the wrist joints to prevent an outline of the robot from overlapping the axis line of at least one of the basic joints.

9. The robot system according to claim 8, wherein
a tool is attached to a tip of each wrist joint,
outline shape information of the tool is stored in the second controller, and
the second controller restricts a motion range of at least one of the basic joints and the wrist joints to prevent the outline of the tool from overlapping the axis line of at least one of the basic joints.

10. A robot system comprising:
a robot comprising:
 a wrist including a plurality of wrist joints,
 a plurality of basic joints configured to determine the position of the wrist in a three-dimensional space, and
 a first controller configured to operate each basic joint,
wherein only the basic joints are provided with torque sensors configured to detect torque of the basic joints about axis lines; and
a second controller configured to control the robot,
wherein outline shape information of the robot is stored in the second controller, and
wherein the second controller restricts a motion range of at least one of the basic joints and the wrist joints to prevent the outline of the robot from overlapping the axis line of at least one of the basic joints.

11. The robot system according to claim 10, wherein
a tool is attached to a tip of each wrist joint,
outline shape information of the tool is stored in the second controller, and
the second controller restricts a motion range of at least one of the basic joints and the wrist joints to prevent the outline of the tool from overlapping the axis line of at least one of the basic joints.

\* \* \* \* \*